R. GATES.
Assignor to S. BEVAN.
Saw-Handles.
No. 8,966. Reissued Nov. 18, 1879.
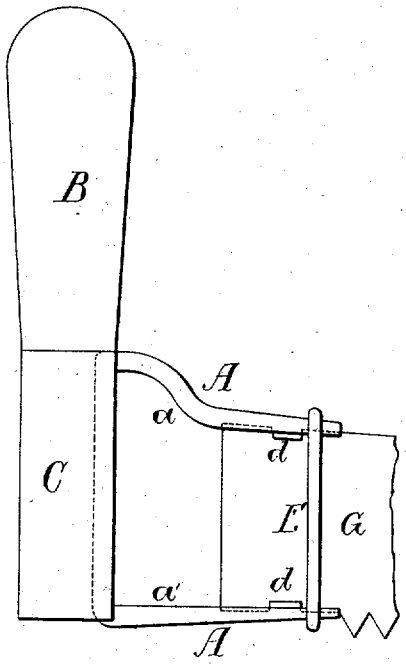
Witnesses
J. M. Deemer
Harry Smith
Inventor
Reuben Gates
by his Attorneys
Howson and Son
M. PETERS, PHOTO-LITHOGRAPHER, WASHINGTON, D. C.

UNITED STATES PATENT OFFICE.

REUBEN GATES, OF PARMA, OHIO, ASSIGNOR TO SAMUEL BEVAN, OF PHILADELPHIA PENNSYLVANIA.

IMPROVEMENT IN SAW-HANDLES.

Specification forming part of Letters Patent No. 98,863, dated January 18, 1870; Reissue No. 8,966, dated November 18, 1879; application filed October 17, 1879.

*To all whom it may concern:*

Be it known that I, REUBEN GATES, of Parma, Cuyahoga county, Ohio, have invented certain Improvements in Crosscut-Saws; and I do hereby declare the following to be a full, clear, and exact description of the same, reference being had to the accompanying drawing.

My invention consists of the combination of a saw-blade with a handle, part of which, constructed for being grasped by one hand of the operator, is above the blade, the other part, constructed to be grasped by the other hand, being opposite the end of the blade, so that the latter shall receive a direct thrust from one hand, while the other hand, grasping the upper portion of the handle, can steady the said blade.

My invention further consists of a mode, described hereinafter, of securing the handle to the blade.

The figure in the accompanying drawing is a side view of my improved handle for saws.

A is a frame, which may be made of malleable iron, and which is secured to the handle B by a ferrule, C, the latter being essentially a part of the handle, or a supplementary handle, for it can be grasped by one hand at a point directly opposite the end of the saw-blade G, while the handle proper, B, is grasped by the other hand.

The under side of the projecting portion *a* of the frame and the upper side of the projecting portion *a'* of the frame are grooved for receiving the edges of the blade, and each of these projecting portions *a a'* is provided with a lug, *d*, which fits into a notch in the blade to prevent the withdrawal of the frame from the same.

An elongated ring, E, clasps the projecting portions of the frame, which are made slightly tapering, so that on driving the ring on the frame the latter will tightly embrace the blade.

When the handle has to be removed from the blade all that is necessary is to drive the ring from the frame.

I claim as my invention—

1. In a crosscut-saw, the combination of the saw-blade with a handle, part of which, adapted to one hand, is above the said blade, and part, adapted to the other hand, directly opposite the end of the said blade, all substantially as set forth.

2. The frame A, elongated ring E, and handle B, the whole being constructed and combined with a saw-blade, substantially as described.

In testimony whereof I have signed my name to this specification in the presence of two subscribing witnesses.

REUBEN GATES.

Witnesses:
G. H. FOSTER,
JAMES LAWRENCE.